US009067695B1

(12) United States Patent
Suh

(10) Patent No.: US 9,067,695 B1
(45) Date of Patent: Jun. 30, 2015

(54) SOLAR ARRAY TRANSFER ORBIT POWER MAXIMIZER

(75) Inventor: Charles H. Suh, Irvine, CA (US)

(73) Assignee: The Boeing Company, Chicago, IL (US)

( * ) Notice: Subject to any disclaimer, the term of this patent is extended or adjusted under 35 U.S.C. 154(b) by 824 days.

(21) Appl. No.: 13/450,176

(22) Filed: Apr. 18, 2012

(51) Int. Cl.
*B64G 1/44* (2006.01)
*H01L 31/042* (2014.01)

(52) U.S. Cl.
CPC ........................ *B64G 1/443* (2013.01)

(58) Field of Classification Search
USPC .................................. 244/172.7; 136/245
See application file for complete search history.

(56) References Cited

U.S. PATENT DOCUMENTS 6,218,605 B1 * 4/2001 Dally et al. ................. 136/244
6,429,368 B1 * 8/2002 Summers .................... 136/245

* cited by examiner

*Primary Examiner* — Brian M O'Hara
(74) *Attorney, Agent, or Firm* — Vista IP Law Group LLP; Cynthia A. Dixon

(57) ABSTRACT

A method, system, and apparatus are disclosed for a solar array transfer orbit power maximizer. The present disclosure teaches a solar array circuitry design that can produce more stowed transfer orbit power than the traditional solar array. The disclosed design is able to achieve the additional stowed transfer orbit power by simply reassigning circuits without adding additional solar cells. In one or more embodiments, the disclosed method involves allocating a first plurality of solar cells to at least one circuit on an inboard panel of the solar array, and allocating a second plurality of solar cells to at least one circuit on an outboard panel of the solar array. The method further involves assigning at least one solar cell from at least one circuit on the inboard panel that is not needed during beginning of life (BOL) to at least one circuit on the outboard panel of the solar array.

20 Claims, 8 Drawing Sheets

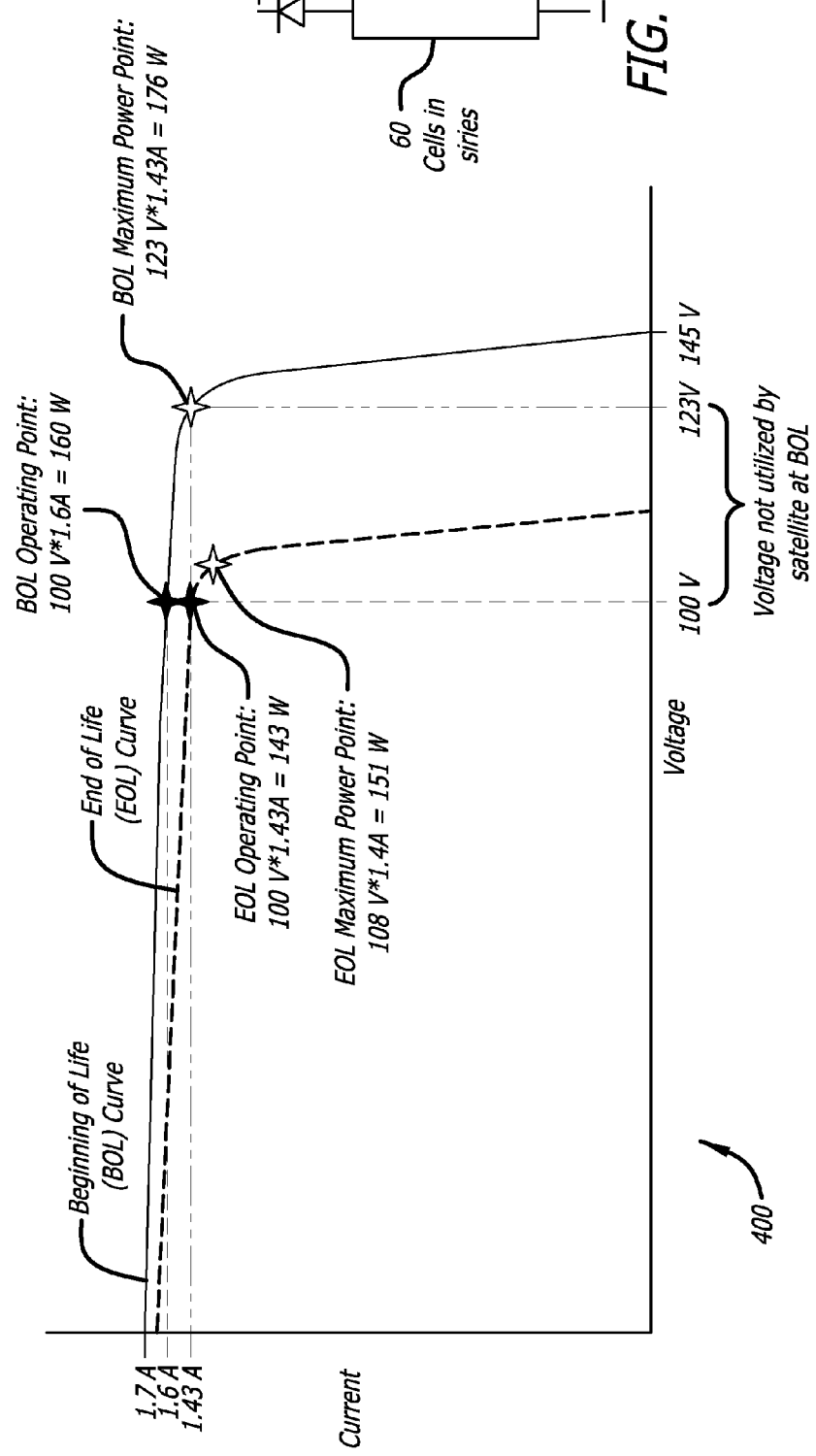

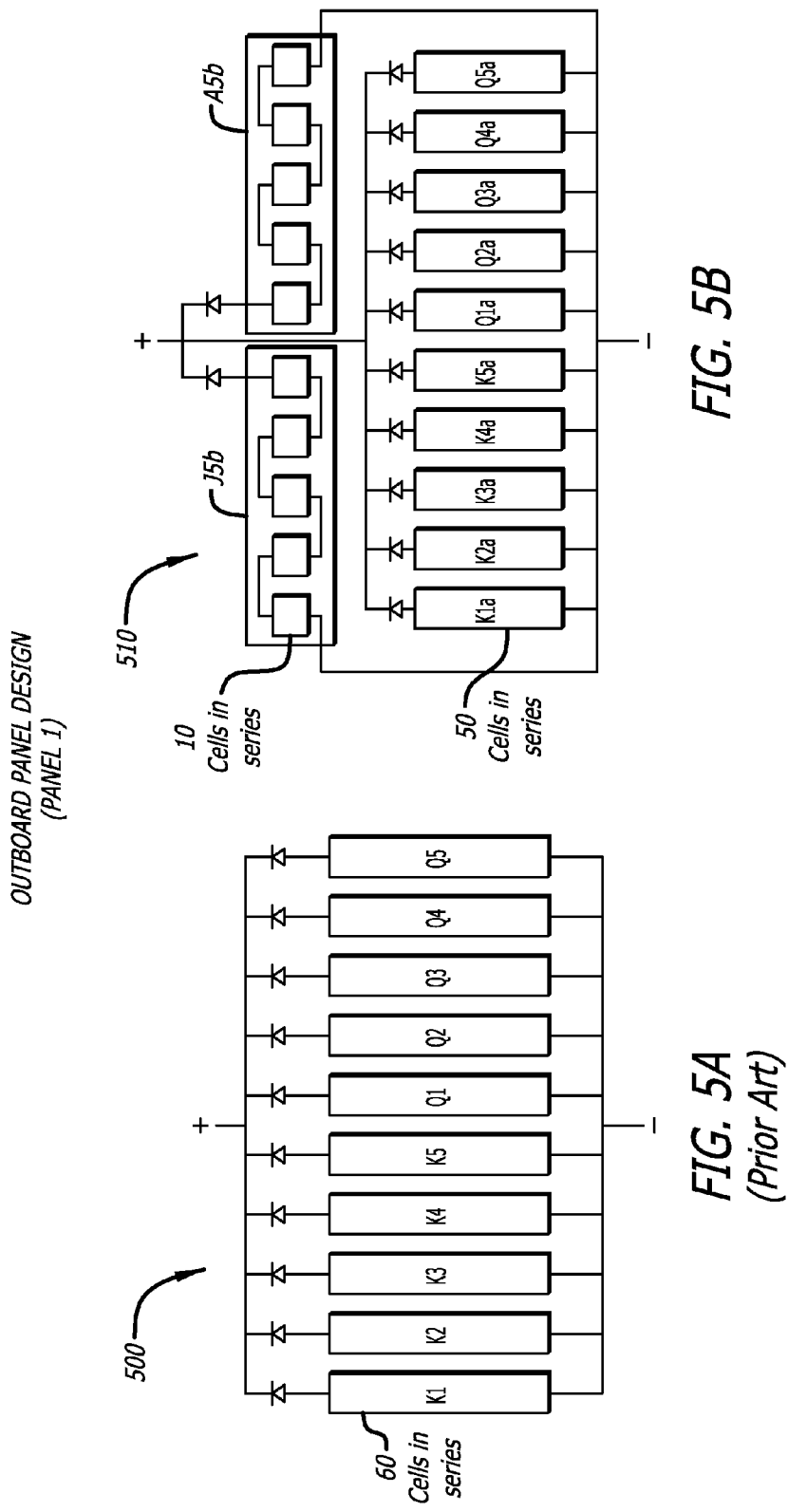

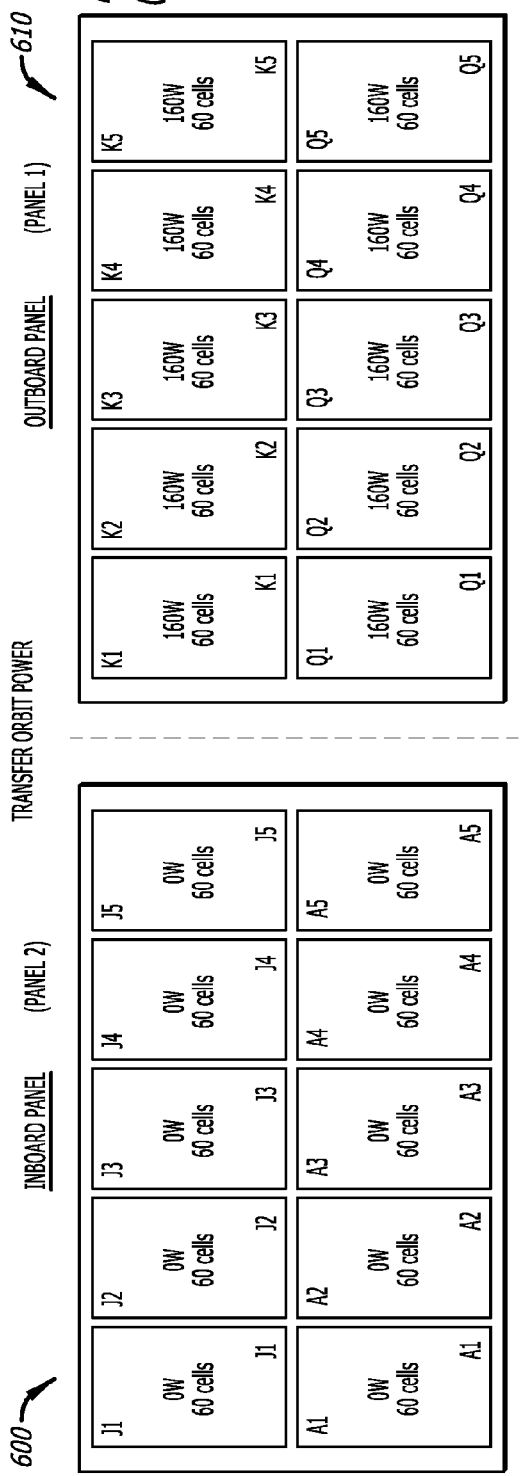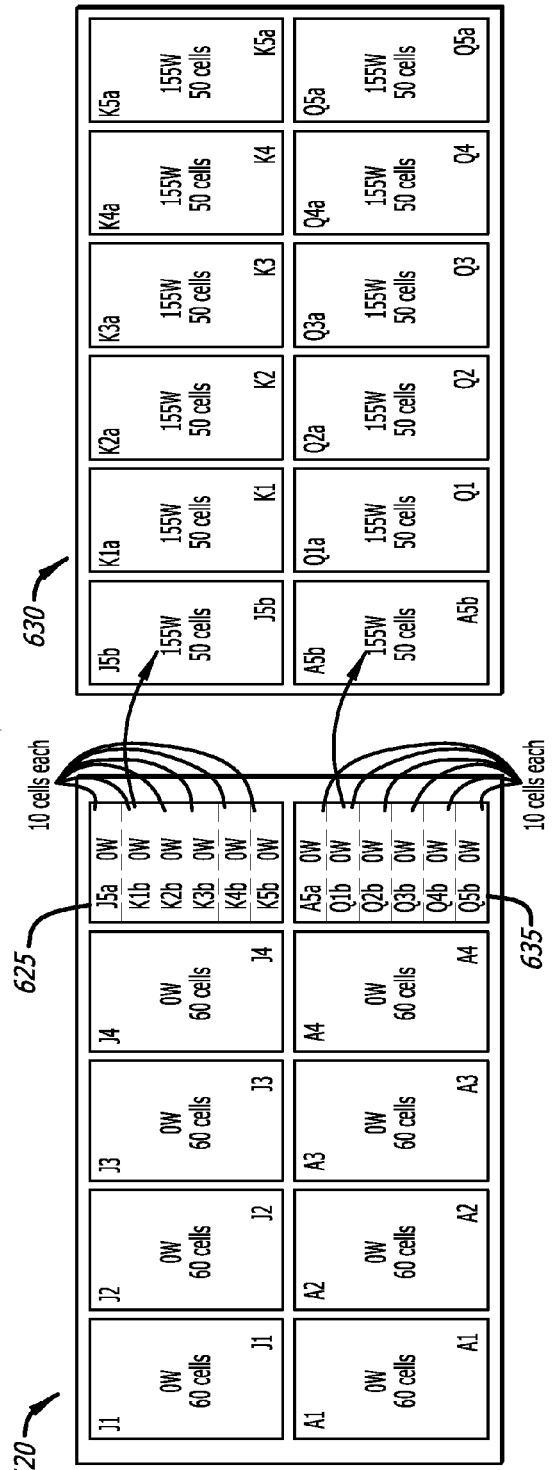
FIG. 6A (Prior Art)
FIG. 6B

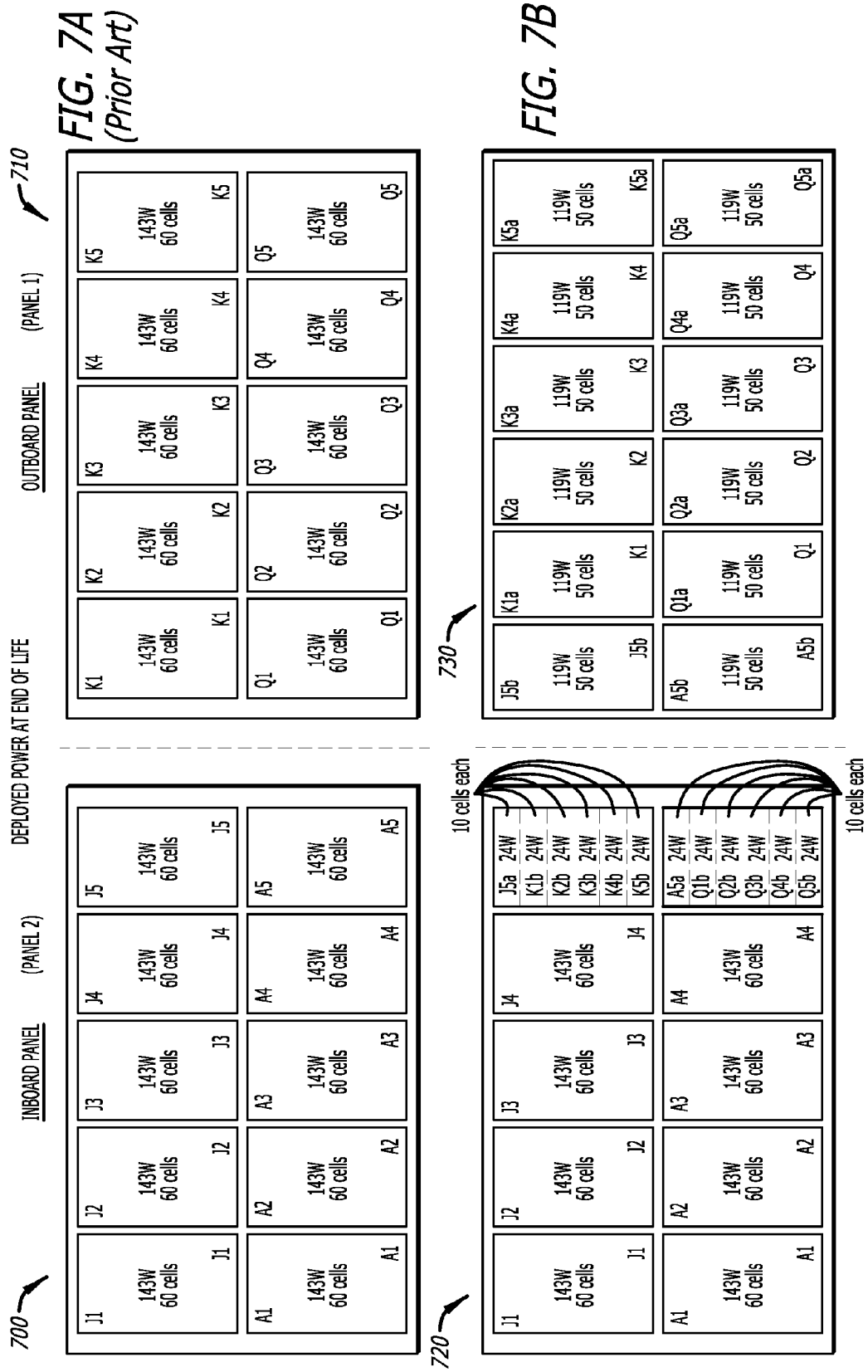

SOLAR ARRAY TRANSFER ORBIT POWER MAXIMIZER

BACKGROUND

The present disclosure relates to solar arrays. In particular, it relates to a solar array transfer orbit power maximizer.

SUMMARY

The present disclosure relates to an apparatus, system, and method for a solar array transfer orbit power maximizer. In one or more embodiments, a disclosed method for maximizing transfer orbit power for a solar array involves allocating a first plurality of solar cells to at least one circuit on an inboard panel of the solar array. The method further involves allocating a second plurality of solar cells to at least one circuit on an outboard panel of the solar array. In addition, the method involves assigning at least one solar cell from at least one circuit on the inboard panel that is not needed during beginning of life (BOL) to at least one of the circuits on the outboard panel of the solar array.

In one or more embodiments, the method further involves bypassing, during transfer orbit, at least one circuit on the inboard panel that the assigned solar cell(s) is from. In some embodiments, the bypassing is achieved by connecting at least one bypass diode in parallel with at least one circuit on the inboard panel that the assigned solar cell(s) is from. In at least one embodiment, the bypassing is achieved by using at least one switch. In one or more embodiments, the bypassing is achieved by using at least one transistor.

In at least one embodiment, the method further comprises connecting passively in series at least one circuit on the inboard panel that the assigned solar cell(s) is from with all of the circuits on the outboard panel, when at least one circuit on the inboard panel that the assigned solar cell(s) is from is illuminated. In some embodiments, the solar array is on a space vehicle. In one or more embodiments, the space vehicle is a satellite. In at least one embodiment, the satellite is a Low Earth Orbiting (LEO) satellite, a Medium Earth Orbiting (MEO) satellite, or a Geostationary Earth Orbiting (GEO) satellite.

In one or more embodiments, a disclosed system for maximizing transfer orbit power for a solar array involves a first plurality of solar cells allocated to at least one circuit on an inboard panel of the solar array. The system further involves a second plurality of solar cells allocated to at least one circuit on an outboard panel of the solar array. In some embodiments, at least one solar cell from at least one circuit on the inboard panel that is not needed during beginning of life (BOL) is assigned to at least one of the circuits on the outboard panel of the solar array.

In at least one embodiment, during transfer orbit, at least one circuit on the inboard panel that the assigned solar cell(s) is from is bypassed. In some embodiments, at least one circuit on the inboard panel that the assigned solar cell(s) is from is bypassed by connecting at least one bypass diode in parallel with the circuit(s) on the inboard panel that the assigned solar cell(s) is from. In at least one embodiment, at least one circuit on the inboard panel that the assigned solar cell(s) is from is bypassed by using at least one switch. In one or more embodiments, at least one circuit on the inboard panel that the assigned solar cell(s) is from is bypassed by using at least one transistor. In at least one embodiment, at least one circuit on the inboard panel that the assigned solar cell(s) is from is connected passively in series with all of the circuits on the outboard panel, when the circuit(s) on the inboard panel that the assigned solar cell(s) is from is illuminated.

In one or more embodiments, a disclosed solar array for maximizing transfer orbit power involves a first plurality of solar cells allocated to at least one circuit on an inboard panel of the solar array. The solar array further involves a second plurality of solar cells allocated to at least one circuit on an outboard panel of the solar array. In at least one embodiment, at least one solar cell from at least one circuit on the inboard panel that is not needed during beginning of life (BOL) is assigned to at least one of the circuits on the outboard panel of the solar array.

The features, functions, and advantages can be achieved independently in various embodiments of the present inventions or may be combined in yet other embodiments.

DRAWINGS

These and other features, aspects, and advantages of the present disclosure will become better understood with regard to the following description, appended claims, and accompanying drawings where:

FIG. 4A is a graph of current versus voltage for Beginning of Life (BOL) and End of Life (EOL) for one solar cell circuit with 60 solar cells in series, in accordance with at least one embodiment of the present disclosure.

FIG. 4B is a diagram of the solar cell circuit with 60 solar cells in series of the graph of FIG. 4A, in accordance with at least one embodiment of the present disclosure.

FIG. 5A is a diagram of a typical solar cell circuitry for a conventional outboard panel.

FIG. 5B is a diagram of solar cell circuitry for the outboard panel of the present disclosure, in accordance with at least one embodiment of the present disclosure.

FIG. 6A is a diagram of a typical inboard panel and outboard panel design for a conventional solar array that also shows the associated transfer orbit power.

FIG. 6B is a diagram of the inboard panel and outboard panel design for the disclosed solar array that also shows the associated transfer orbit power, in accordance with at least one embodiment of the present disclosure.

FIG. 7A is a diagram of a typical inboard panel and outboard panel design for a conventional solar array that also shows the associated deployed power at End of Life (EOL).

FIG. 7B is a diagram of the inboard panel and outboard panel design for the disclosed solar array that also shows the associated deployed power at End of Life (EOL), in accordance with at least one embodiment of the present disclosure.

DESCRIPTION

The methods and apparatus disclosed herein provide an operative system for a solar array transfer orbit power maximizer. In particular, the present disclosure teaches a solar array circuitry design that can produce more stowed transfer orbit power than the traditional solar array circuitry design. The disclosed design is able to achieve additional stowed transfer orbit power by simply reassigning solar cell circuits and without the need for adding additional solar cells to the solar array.

Typical solar array circuitry designs for spacecraft solar wings are based on the End of Life (EOL) degraded solar cell performance. The EOL for a geostationary satellite, for example, is typically 15 years in orbit, and during this time, the solar cell power degrades with radiation. Over this time period, the performance of the individual solar cells degrades. For example, for a solar array circuitry design for a Boeing 702 satellite, each solar cell degrades roughly fourteen percent (14%) in maximum power, eleven percent (11%) in voltage, and four percent (4%) in current.

The solar array circuitry design is designed to maintain a specified voltage at maximum power at EOL. For example, the solar array circuitry design for a Boeing 702 satellite needs to maintain a 100 volts (V) at maximum power at EOL. In order to achieve this voltage requirement, the solar array circuitry design (for a Boeing 702 satellite for example) is designed with approximately 11% excess voltage at Beginning of Life (BOL) or, in other words, the solar array circuitry design includes approximately 11% more solar cells in series in order to obtain the necessary EOL voltage. At BOL and at transfer orbit, this approximately 11% of extra voltage is not used because a Power Control Unit (PCU) is utilized to clamp the voltage to the 100 V requirement.

The solar array circuitry design of the present disclosure utilizes the lost voltage (e.g., the approximately 11% of lost voltage of the solar array circuitry design of a Boeing 702 satellite) by making a simple adjustment to the layout of the solar cells on the solar array of the solar wing. This disclosed solar array circuitry design will be beneficial for spacecraft with fixed voltage system (e.g., Boeing 702 satellites) that need little more power output during transfer orbit when the solar wings are stowed. This design, however, will not be beneficial for spacecraft with maximum power tracking capabilities since they will always utilize all of the power from their solar cells. It should be noted that even though there is approximately 11% of excess voltage and solar cells at BOL for the solar array circuitry design of a Boeing 702 satellite, in reality, the gain in power may be less than this depending on the size of the solar cells and the packing factor of the solar wing.

Figure 1:
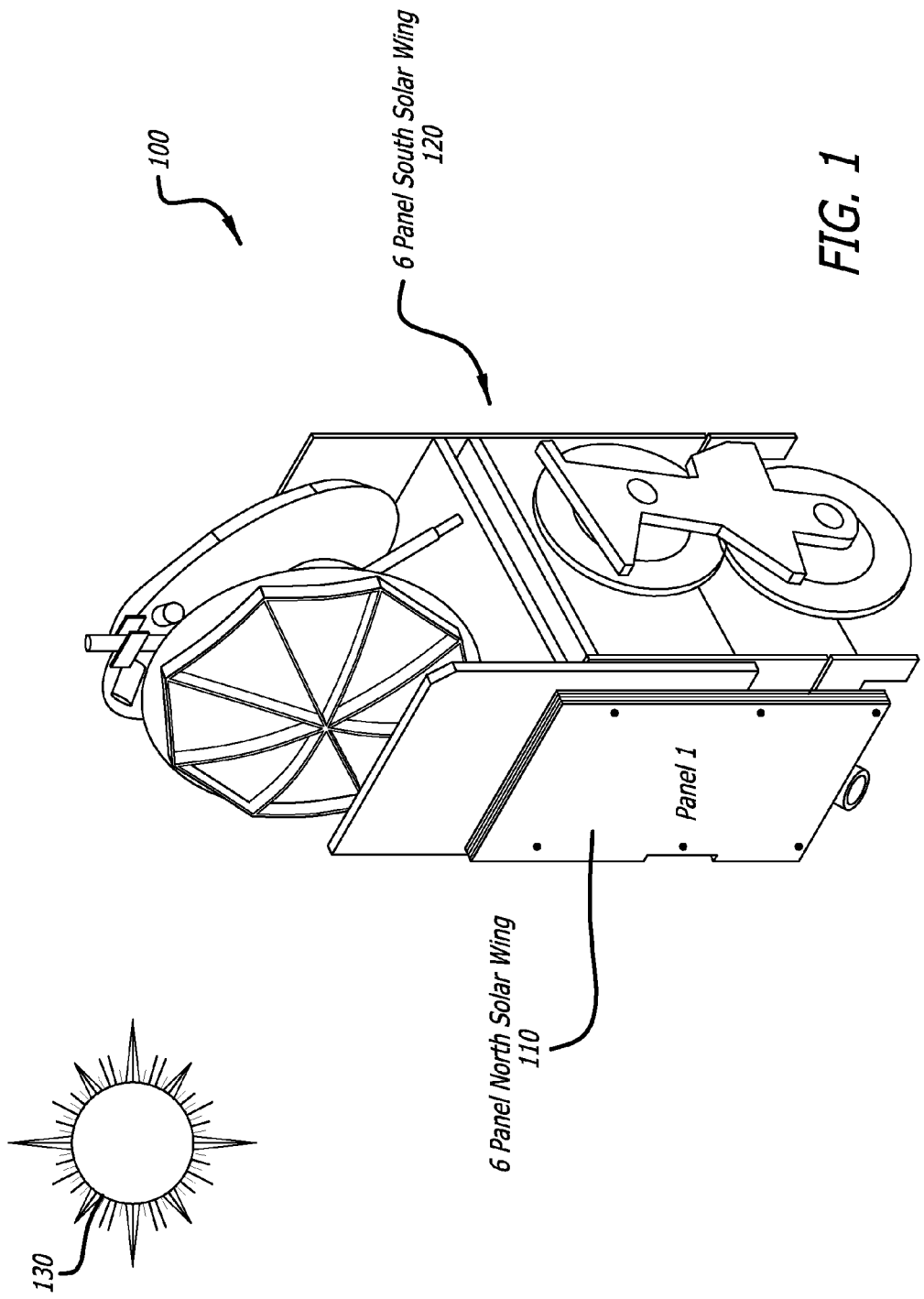
FIG. 1 is a diagram of an exemplary spacecraft that utilizes the disclosed solar array circuitry design where the solar wings are in a stowed configuration, in accordance with at least one embodiment of the present disclosure.

FIG. 1 is a diagram of an exemplary spacecraft 100 that utilizes the disclosed solar array circuitry design where the solar wings 110, 120 are in a stowed configuration, in accordance with at least one embodiment of the present disclosure. In this figure, a satellite 100 is shown. The satellite 100 in FIG. 1 is a Boeing 702 satellite. It should be noted that the disclosed solar array circuitry design may be utilized with various different types of spacecraft other than a Boeing 702 satellite as is shown in FIG. 1. Various different types of spacecraft that may be employed by the disclosed solar array circuitry design include, but are not limited to, Low Earth Orbiting (LEO) satellites, Medium Earth Orbiting (MEO) satellites, Geostationary Earth Orbiting (GEO) satellites, and other various types of spacecraft or space vehicles.

The satellite 100 in FIG. 1 is shown to include two solar wings 110, 120. These two solar wings 110, 120 are a six panel north solar wing 110 and a six panel south solar wing 120. In this figure, both solar wings 110, 120 are shown to be in their stowed position. In the stowed position, the outboard panel (panel 1) is the only panel of each solar wing 110, 120 that is exposed to the sun 130. Note that only the outboard panel (panel 1) of the north solar wing 110 can be seen in FIG. 1.

Figure 2:
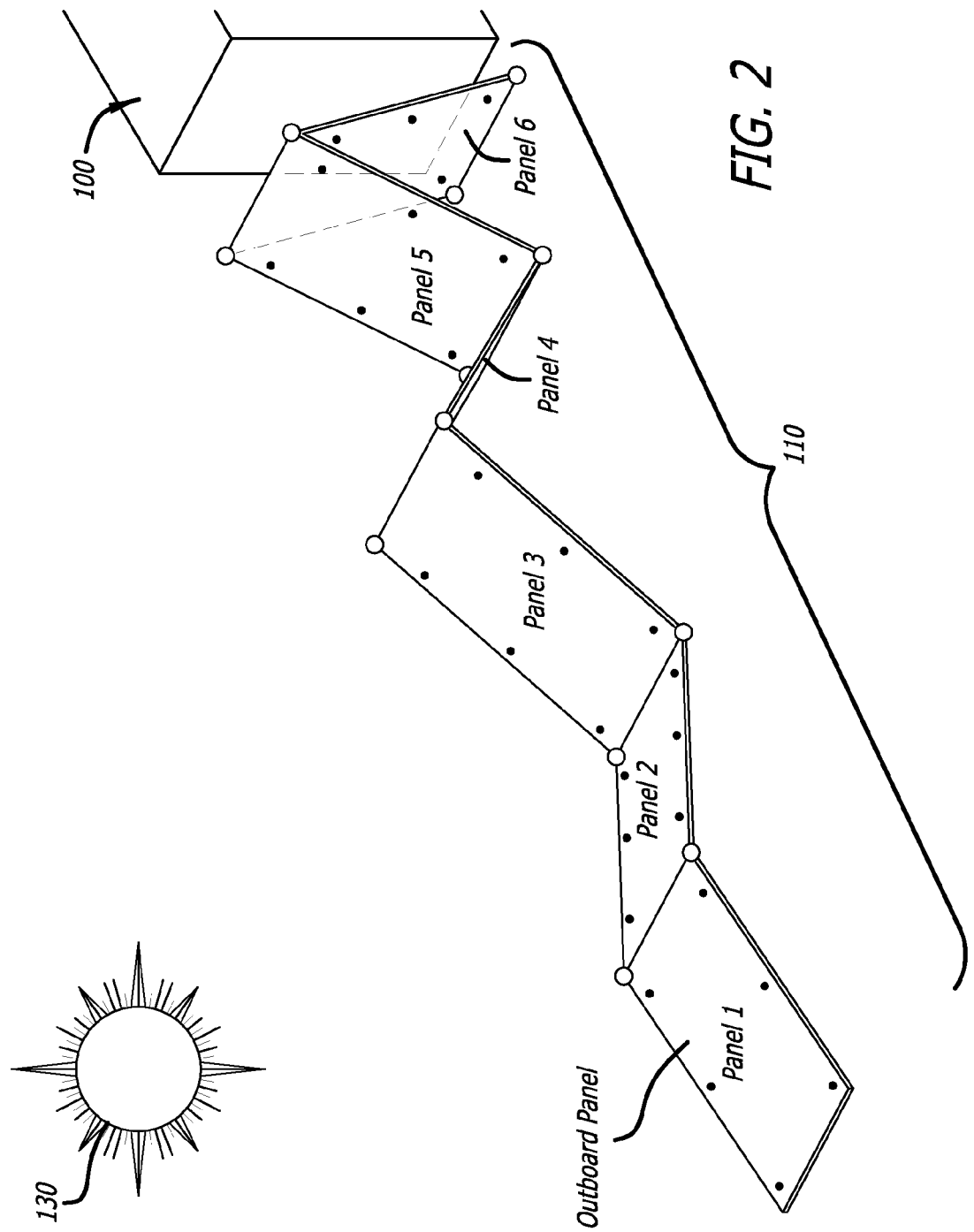
FIG. 2 is a diagram of the exemplary spacecraft of FIG. 1 where the solar wings are being deployed, in accordance with at least one embodiment of the present disclosure.

FIG. 2 is a diagram of the exemplary spacecraft 100 of FIG. 1 where the solar wings 110, 120 are being deployed, in accordance with at least one embodiment of the present disclosure. In this figure, the solar wings 110, 120 are being deployed from their stowed position as is shown in FIG. 1. Note that only the north solar wing 110 can be seen in FIG. 2. As previously mentioned, each solar wing 110, 120 contains six panels (Panel 1, Panel 2, Panel 3, Panel 4, Panel 5, and Panel 6). Panel 1 of each solar wing 110, 120 is the outboard panel; and Panel 2, Panel 3, Panel 4, Panel 5, and Panel 6 are each an inboard panel.

Figure 3:
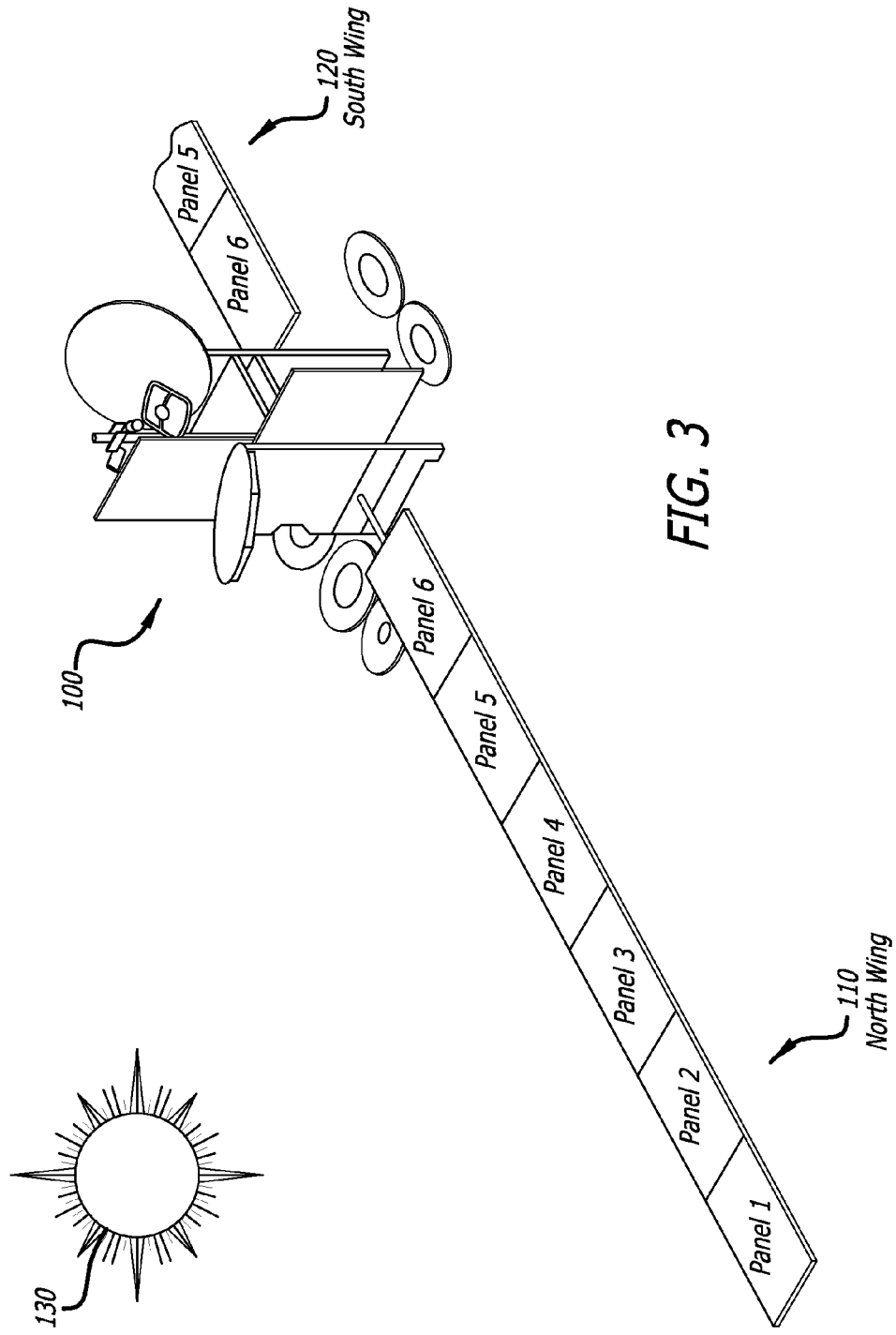
FIG. 3 is a diagram of the exemplary spacecraft of FIG. 1 where the solar wings are completely deployed, in accordance with at least one embodiment of the present disclosure.

FIG. 3 is a diagram of the exemplary spacecraft 100 of FIG. 1 where the solar wings 110, 120 are completely deployed, in accordance with at least one embodiment of the present disclosure. In this figure, the north wing 110 and part of the south wing 120 are shown to be completely deployed. When the solar wings 110, 120 are completely deployed, all six panels of the solar wings 110, 120 are exposed to the sun 130.

FIG. 4A is a graph 400 of current versus voltage for Beginning of Life (BOL) and End of Life (EOL) for one solar cell circuit with 60 solar cells in series, in accordance with at least one embodiment of the present disclosure. For the conventional solar array circuitry design for a solar wing of a Boeing 702 satellite, each solar array circuit contains 60 solar cells in series. This design meets the EOL voltage requirement of 100 volts. In this figure, the graph 400 shows the BOL and EOL effects of the solar cell circuit having 60 solar cells in series. At BOL, the maximum power point (i.e. 176 W) of the solar cell circuit is shown to be far higher than the BOL operating point (160 W) at the 100 V operating voltage. This difference in power (176 W−160 W=16 W) represents underutilized power from the solar cell circuit.

FIG. 4B is a diagram of the solar cell circuit 410 with 60 solar cells in series of the graph 100 of FIG. 4A, in accordance with at least one embodiment of the present disclosure. In this figure, the solar cell circuit 410 is shown to include 60 solar cells in series.

FIG. 5A is a diagram of a typical solar cell circuitry for a conventional outboard panel 500. In this figure, the conventional outboard panel (Panel 1) is shown to contain 10 solar cell circuits. These solar cell circuits are denoted as K1, K2, K3, K4, K5, Q1, Q2, Q3, Q4, and Q5. Each solar cell circuit K1, K2, K3, K4, K5, Q1, Q2, Q3, Q4, Q5 contains 60 solar cells connected in series. As such, the outboard panel (Panel 1) is shown to have a total of 600 solar cells. The solar cell circuits K1, K2, K3, K4, K5, Q1, Q2, Q3, Q4, Q5 are shown to be connected together in parallel.

FIG. 5B is a diagram of solar cell circuitry for the outboard panel 510 of the present disclosure, in accordance with at least one embodiment of the present disclosure. In this figure, the disclosed outboard panel (Panel 1) is shown to contain 12 solar cell circuits. These solar cell circuits are denoted as K1a, K2a, K3a, K4a, K5a, Q1a, Q2a, Q3a, Q4a, Q5a, J5b, and A5b. Solar cells circuits K1a, K2a, K3a, K4a, K5a, Q1a, Q2a, Q3a, Q4a, and Q5a each contain 50 solar cells connected in series. And, solar cell circuits J5b and A5b each contain 5 sets of 10 solar cells connected in series. As such, the outboard panel (Panel 1) is shown to have a total of 600 solar cells. The solar cell circuits K1a, K2a, K3a, K4a, K5a, Q1a, Q2a, Q3a, Q4a, Q5a, J5b, and A5b are shown to be connected together in parallel.

Only 10 circuits with 50 solar cells in series (i.e. K1a, K2a, K3a, K4a, K5a, Q1a, Q2a, Q3a, Q4a, and Q5a) are needed to match the BOL maximum power point to the 100 V operating voltage of the spacecraft. The excess voltage at BOL is re-allocated as additional circuits J5b and A5b. As such, the solar cells of circuits J5b and A5b are freed up to provide additional power. This disclosed design provides approximately 20% more power by using same number of solar cells per panel (i.e. 600 solar cells per panel).

FIG. 6A is a diagram of a typical inboard panel 600 and outboard panel (Panel 1) 610 design for a conventional solar array that also shows the associated transfer orbit power. In this figure, both the inboard panel 600 and the outboard panel 610 are shown to each have 10 circuits connected in parallel. The inboard panel 600 has circuits J1, J2, J3, J4, J5, A1, A2, A3, A4, and A5. And, the outboard panel has circuits K1, K2, K3, K4, K5, Q1, Q2, Q3, Q4, and Q5. Each of the circuits (J1, J2, J3, J4, J5, A1, A2, A3, A4, A5, K1, K2, K3, K4, K5, Q1, Q2, Q3, Q4, and Q5) includes 60 solar cells connected in series. As such, both the inboard panel 600 and the outboard panel 610 are each shown to have a total of 600 solar cells.

During transfer orbit, since the solar cells of the inboard panel 600 are not exposed to the sun, its circuits J1, J2, J3, J4, J5, A1, A2, A3, A4, and A5 are shown to be producing no power (0 watts (W)). However, since during transfer orbit the outboard panel's 610 solar cells are exposed to the sun, each of the circuits of the outboard panel K1, K2, K3, K4, K5, Q1, Q2, Q3, Q4, and Q5 are shown to be producing 160 watts (W) of power.

It should be noted that for this design, all of the inboard panels (i.e. Panel 2, Panel 3, Panel 4, Panel 5, and Panel 6) have the design as shown for inboard panel 600.

FIG. 6B is a diagram of the inboard panel (Panel 2) 620 and outboard panel (Panel 1) 630 design for the disclosed solar array that also shows the associated transfer orbit power, in accordance with at least one embodiment of the present disclosure. In this figure, the inboard panel (Panel 2) 620 is shown to have 10 circuits connected in parallel. Eight of the ten circuits each have 60 cells connected in series. These eight circuits are denoted as J1, J2, J3, J4, A1, A2, A3, and A4. The remaining two circuits 625, 635 each contain six sets of 10 solar cells connected in series. The six sets of solar cells for circuit 625 are denoted as J5a, K1b, K2b, K3b, K4b, K5b. And, the six sets of solar cells for circuit 635 are denoted as A5a, Q1b, Q2b, Q3b, Q4b, and Q5b. As such, the inboard panel (Panel 2) 620 is shown to have a total of 600 solar cells.

It should be noted that this disclosed inboard panel design 620 is only utilized for inboard panel Panel 2 of the solar wing. The remaining inboard panels (Panel 3, Panel 4, Panel 5, and Panel 6) of the solar wing will have the design of inboard panel 600 as depicted in FIG. 6A.

Also in FIG. 6B, the outboard panel (Panel 1) 630 is shown to have 12 circuits connected in parallel. The 12 circuits of outboard panel 630 are denoted as J5b, K1a, K2a, K3a, K4a, K5a, A5b, Q1a, Q2a, Q3a, Q4a, and Q5a. Each of the circuits (J5b, K1a, K2a, K3a, K4a, K5a, A5b, Q1a, Q2a, Q3a, Q4a, and Q5a) includes 50 solar cells connected in series. As such, the outboard panel (Panel 1) 630 is shown to have a total of 600 solar cells.

As can be seen when viewing FIGS. 6A and 6B together, some of the solar cells on the outboard panel (Panel 1) 630 have been reassigned as circuits J5a and A5b. Part of circuits K1 through K5 and Q1 through Q5 of the conventional outboard panel (Panel 1) 610 design have been reassigned to the inboard panel (Panel 2) 620 as K1b, K2b, K3b, K4b, K5b, Q1b, Q2b, Q3b, Q4b, and Q5b.

During transfer orbit (i.e. the solar wings are in a stowed condition) all the circuits on the inboard panel (Panel 2) 620 are bypassed by the use of bypass diodes. Also during transfer orbit, each of the circuits on the outboard panel (Panel 1) 630 are shown to be producing 155 watts (W) of power.

The difference in power output during transfer orbit between the disclosed solar array design and the conventional solar array design is 1860 W (i.e. 155 W*12 circuits) verses 1600 W (i.e. 160 W*10 circuits). The disclosed solar array design thereby providing approximately 16% gain in power. It should be noted that to achieve this increase in power, the total number of solar cells per panel is not changed from the conventional design to the disclosed design, only the circuit arrangement is changed.

It should be noted that the disclosed outboard design (Panel 1) 630 by itself will not generate enough voltage as it degrades with radiation during the rest of the life of the spacecraft because the solar cells on the inboard panel (Panel 2) 620 are normally bypassed during transfer orbit through the integral bypass diodes in the solar cells. In order to achieve the required EOL voltage, the small outboard circuits (i.e. each with 50 solar cells in series) J5b, K1a, K2a, K3a, K4a, K5a, A5b, Q1a, Q2a, Q3a, Q4a, and Q5a are connected in series with solar cell sets on the inboard panel (i.e. each with 10 solar cells in series) K1b, K2b, K3b, K4b, K5b, Q1b, Q2b, Q3b, Q4b, and Q5b to achieve the proper EOL voltage. This connection is done passively during the normal deployment operation of the solar wing when the sun hits the circuits on the inboard panel (Panel 2) 620. This act of tying the solar cells in series from another panel is termed "passively" because there is no active switching or any commanding from the spacecraft besides the normal launch lock release sequence for deployment of the solar wing.

FIG. 7A is a diagram of a typical inboard panel 700 and outboard panel 710 design for a conventional solar array that also shows the associated deployed power at End of Life (EOL). And, FIG. 7B is a diagram of the inboard panel 720 and outboard panel 730 design for the disclosed solar array that also shows the associated deployed power at End of Life (EOL), in accordance with at least one embodiment of the present disclosure. Upon review of FIGS. 7A and 7B, it is evident that at this deployed state of the solar wing, the power output of the inboard panel 700 and outboard panel 710 disclosed design (2860 W=20*143 W) is the same power output of the inboard panel 720 and outboard panel 730 of the traditional design (2860 W=(8*143 W)+(12*24 W)+(12*119 W)).

Figures 8A, 8B:
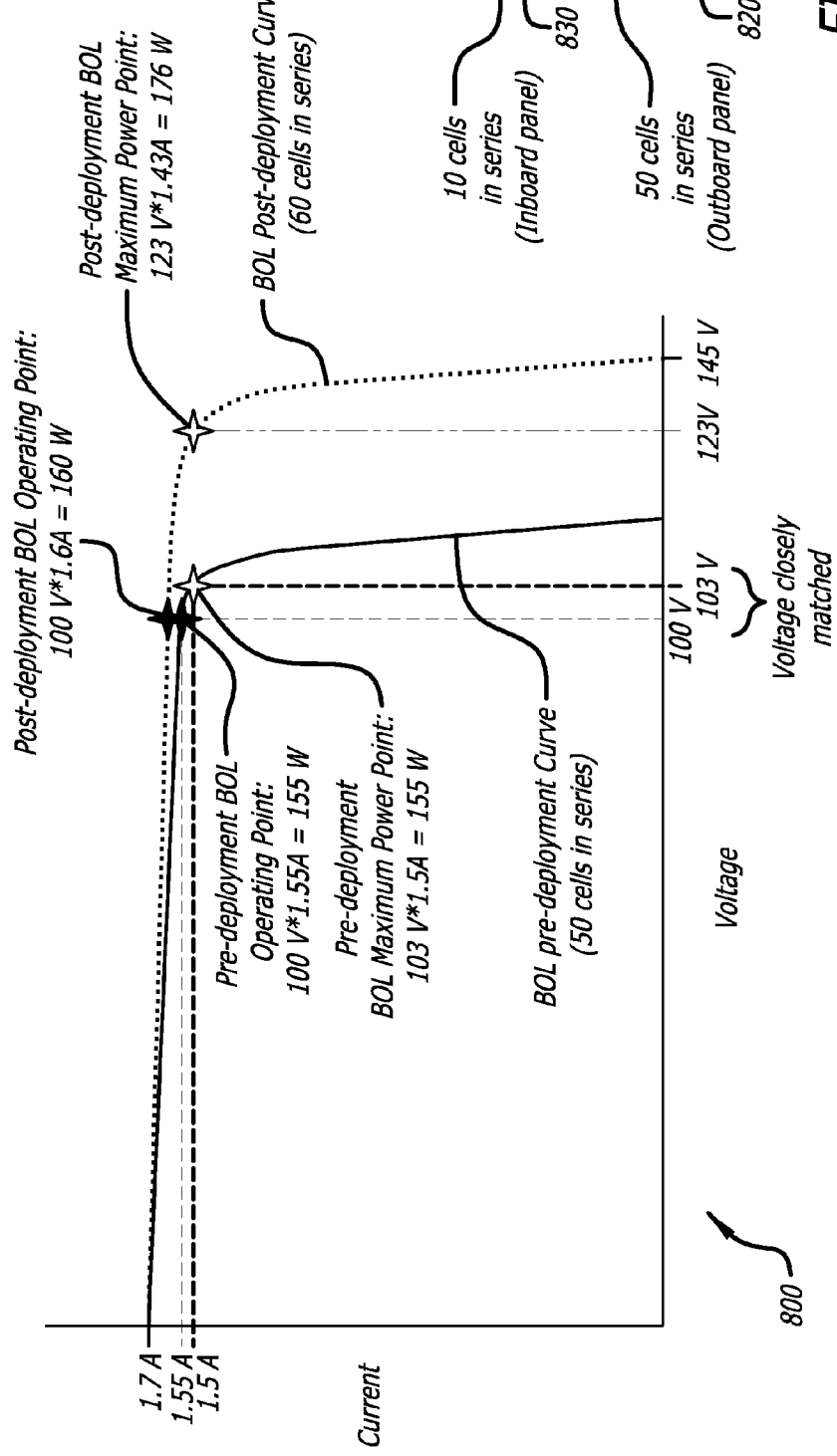
FIG. 8A is a graph of current versus voltage for before and after wing deployment during Beginning of Life (BOL) for one solar cell circuit of the disclosed outboard design, in accordance with at least one embodiment of the present disclosure.
FIG. 8B is a diagram of the solar cell circuit of the disclosed circuit design of the graph of FIG. 8A, in accordance with at least one embodiment of the present disclosure.

FIG. 8A is a graph 800 of current versus voltage for before and after wing deployment during Beginning of Life (BOL) for one solar cell circuit of the disclosed outboard design, in accordance with at least one embodiment of the present disclosure. In this figure, the pre-deployment power (denoted by the solid line) of a single solar cell circuit is shown on graph 800 to be only slightly lower at 155 W than the post-deployment power (denoted by the dotted line) of 160 W. But, since this disclosed design gains two more circuits at 155 W each, this translates to a power increase in transfer orbit power from the conventional design power of 1600 W (i.e. 10*160 W) to the disclosed design power of 1860 W (i.e. 12*155 W) as is shown in FIGS. 6A and 6B.

FIG. 8B is a diagram of the solar cell circuit 810 of the disclosed outboard design of the graph of FIG. 8A, in accordance with at least one embodiment of the present disclosure. In this figure, a circuit 820 (from the outboard panel), which has 50 solar cells connected in series, is shown to be connected to a set 830 (from the inboard panel) of 10 solar cells connected in series. In addition, an optional bypass diode 840 is shown to be connected in parallel with the set 830 of 10 solar cells. The bypass diode 840 is used to bypass the set 830 of 10 solar cells during transfer orbit. It should be noted that in other embodiments, various other devices than a bypass diode may be employed by the disclosed design to bypass the solar cells during transfer orbit. Various other devices that may be used by the disclosed design instead of a bypass diode include, but are not limited to, a switch and a transistor.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A method for maximizing transfer orbit power for a solar array, the method comprising:
   providing at least one inboard panel for the solar array, wherein each of the at least one inboard panel comprises at least one first inboard circuit and at least one second inboard circuit;
   providing at least one outboard panel for the solar array, wherein each of the at least one outboard panel comprises at least one outboard circuit,
   wherein each of the at least one first inboard circuit, each of the at least one second inboard circuit, and each of the at least one outboard circuit comprises solar cells;
   bypassing the solar cells of the at least one first inboard circuit and the at least one second inboard circuit, when the solar array is in a stowed position during transfer orbit; and
   connecting at least one of the at least one second inboard circuit to at least one of the at least one outboard circuit, when the solar array is in a deployed position and at least one of the at least one first inboard circuit and the at least one second inboard circuit is illuminated by solar radiation.

2. The method of claim 1, wherein the bypassing is achieved by connecting at least one bypass diode in parallel with the at least one first inboard circuit and the at least one second inboard circuit.

3. The method of claim 1, wherein the bypassing is achieved by using at least one switch.

4. The method of claim 1, wherein the bypassing is achieved by using at least one transistor.

5. The method of claim 1, wherein the connecting of at least one of the at least one second inboard circuit to at least one of the at least one outboard circuit is performed by connecting passively.

6. The method of claim 1, wherein the solar array is on a space vehicle.

7. The method of claim 6, wherein the space vehicle is a satellite.

8. The method of claim 7, wherein the satellite is one of a Low Earth Orbiting (LEO) satellite, a Medium Earth Orbiting (MEO) satellite, and a Geostationary Earth Orbiting (GEO) satellite.

9. A system for maximizing transfer orbit power for a solar array, the system comprising:
   the solar array;
   at least one inboard panel for the solar array, wherein each of the at least one inboard panel comprises at least one first inboard circuit and at least one second inboard circuit; and
   at least one outboard panel for the solar array, wherein each of the at least one outboard panel comprises at least one outboard circuit,
   wherein each of the at least one first inboard circuit, each of the at least one second inboard circuit, and each of the at least one outboard circuit comprises solar cells;
   wherein when the solar array is in a stowed position during transfer orbit, the solar cells of the at least one first inboard circuit and the at least one second inboard circuit are bypassed; and
   wherein when the solar array is in a deployed position and at least one of the at least one first inboard circuit and the at least one second inboard circuit is illuminated by solar radiation, at least one of the at least one second inboard circuit is connected to at least one of the at least one outboard circuit.

10. The system of claim 9, wherein the solar cells of the at least one first inboard circuit and the at least one second inboard circuit are bypassed by connecting at least one bypass diode in parallel with the at least one first inboard circuit and the at least one second inboard circuit.

11. The system of claim 9, wherein the at least one first inboard circuit and the at least one second inboard circuit are bypassed by using at least one switch.

12. The system of claim 9, wherein the at least one first inboard circuit and the at least one second inboard circuit are bypassed by using at least one transistor.

13. The system of claim 9, wherein the connecting of at least one of the at least one second inboard circuit to at least one of the at least one outboard circuit is performed by connecting passively.

14. The system of claim 9, wherein the solar array is on a space vehicle.

15. The system of claim 14, wherein the space vehicle is a satellite.

16. The system of claim 15, wherein the satellite is one of a Low Earth Orbiting (LEO) satellite, a Medium Earth Orbiting (MEO) satellite, and a Geostationary Earth Orbiting (GEO) satellite.

17. A solar array for maximizing transfer orbit power, the solar array comprising:
   at least one inboard panel for the solar array, wherein each of the at least one inboard panel comprises at least one first inboard circuit and at least one second inboard circuit; and
   at least one outboard panel for the solar array, wherein each of the at least one outboard panel comprises at least one outboard circuit,
   wherein each of the at least one first inboard circuit, each of the at least one second inboard circuit, and each of the at least one outboard circuit comprises solar cells;
   wherein when the solar array is in a stowed position during transfer orbit, the solar cells of the at least one first inboard circuit and the at least one second inboard circuit are bypassed; and
   wherein when the solar array is in a deployed position and at least one of the at least one first inboard circuit and the at least one second inboard circuit is illuminated by solar radiation, at least one of the at least one second inboard circuit is connected to at least one of the at least one outboard circuit.

18. The solar array of claim 17, wherein the solar cells of the at least one first inboard circuit and the at least one second inboard circuit are bypassed by connecting at least one bypass diode in parallel with the at least one first inboard circuit and the at least one second inboard circuit.

19. The solar array of claim 17, wherein the at least one first inboard circuit and the at least one second inboard circuit are bypassed by using at least one switch.

20. The solar array of claim 17, wherein the at least one first inboard circuit and the at least one second inboard circuit are bypassed by using at least one transistor.

* * * * *